(12) United States Patent
Seppala et al.

(10) Patent No.: US 11,692,485 B2
(45) Date of Patent: Jul. 4, 2023

(54) GAS TURBINE ENGINE WITH SPOOLIE FLUID TRANSFER CONNECTION

(71) Applicant: General Electric Company, Schenectady, NY (US)

(72) Inventors: Benjamin Johannes Seppala, Madeira, OH (US); Kenneth Jay Moore, Fairfield Township, OH (US); Thomas Ryan Wallace, Cincinnati, OH (US)

(73) Assignee: GENERAI, ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/178,429

(22) Filed: Feb. 18, 2021

(65) Prior Publication Data

US 2022/0260017 A1 Aug. 18, 2022

(51) Int. Cl.
*F02C 7/16* (2006.01)
*F01D 25/12* (2006.01)
*F01D 9/06* (2006.01)

(52) U.S. Cl.
CPC .................. *F02C 7/16* (2013.01); *F01D 9/06* (2013.01); *F01D 25/12* (2013.01); *F05D 2220/32* (2013.01); *F05D 2260/20* (2013.01); *F05D 2260/60* (2013.01)

(58) Field of Classification Search
CPC ....................................................... F01D 9/06
See application file for complete search history.

(56) References Cited

U.S. PATENT DOCUMENTS

| 1,015,435 | A | 1/1912 | Greenlaw et al. |
|---|---|---|---|
| 5,149,146 | A | 9/1992 | Simoni |
| 5,593,274 | A | 1/1997 | Carreno et al. |
| 6,382,906 | B1 | 5/2002 | Brassfield et al. |
| 6,397,604 | B2 | 6/2002 | Eldrid et al. |
| 6,524,062 | B2 | 2/2003 | Lathrop et al. |
| 6,890,147 | B2 | 5/2005 | Pecchioli |
| 7,029,236 | B2 | 4/2006 | Marushima et al. |
| 7,540,707 | B2 | 6/2009 | Dervaux et al. |
| 8,932,007 | B2 | 1/2015 | Khanin et al. |
| 9,011,079 | B2 | 4/2015 | Coign et al. |
| 9,920,869 | B2 * | 3/2018 | Davis ...................... F16L 21/02 |
| 9,927,123 | B2 * | 3/2018 | Hagan ...................... F23R 3/26 |
| 10,196,935 | B2 | 2/2019 | Deane et al. |
| 10,378,379 | B2 | 8/2019 | Manteiga et al. |
| 10,662,792 | B2 * | 5/2020 | Harris ..................... F01D 9/041 |
| 2009/0079185 | A1 | 3/2009 | Carbines-Evans et al. |

* cited by examiner

*Primary Examiner* — Courtney D Heinle
*Assistant Examiner* — John S Hunter, Jr.
(74) *Attorney, Agent, or Firm* — Venable LLP; Peter T. Hrubiec; Michele V. Frank (57) ABSTRACT

A gas turbine engine having a fluid transfer connection is provided. The gas turbine engine includes a first component configured to channel a flow of air from a portion of the gas turbine engine; a second component configured to receive the flow of air from the first component, wherein the first component and the second component are movable relative to one another; a sleeve portion disposed between the first component and the second component; and a spoolie device disposed within the sleeve portion, the spoolie device having elliptical shaped opposing ends, wherein the spoolie device bridges the first component and the second component to channel the flow of air from the first component to the second component.

20 Claims, 5 Drawing Sheets

GAS TURBINE ENGINE WITH SPOOLIE FLUID TRANSFER CONNECTION

FEDERALLY SPONSORED RESEARCH

This invention was made with United States Government support. The Government has certain rights in this invention.

FIELD

The present subject matter relates generally to a gas turbine engine, or more particularly to a spoolie fluid transfer connection in a gas turbine engine.

BACKGROUND

In general, fluid tubing connections between structures that have relative displacements may include short tubes. Due to the surrounding fluid environment in a gas turbine engine, these components and the interfacing components operate at significantly different and high temperatures. Existing tubes result in the application of hoop stress between the tubes and interfacing components which exceed the yield strength of the available materials of the tubes. This causes the tubes to yield and permanently deform to a diameter that weakens the seal between the components during subsequent lower power operations. However, operation of such tubes with a loose fit results in rapid tube wear.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine having a fluid transfer connection is provided. The gas turbine engine includes a first component configured to channel a flow of air from a portion of the gas turbine engine; a second component configured to receive the flow of air from the first component, wherein the first component and the second component are movable relative to one another; a sleeve portion disposed between the first component and the second component; and a spoolie device disposed within the sleeve portion, the spoolie device having elliptical shaped opposing ends, wherein the spoolie device bridges the first component and the second component to channel the flow of air from the first component to the second component.

In certain exemplary embodiments the elliptical shaped opposing ends of the spoolie device form a seal between the first component and the second component.

In certain exemplary embodiments the elliptical shaped opposing ends of the spoolie device form the seal with relative positions between the first component and the second component changing.

In certain exemplary embodiments the elliptical shaped opposing ends of the spoolie device form the seal between the first component and the second component both during an initial operating temperature of the gas turbine engine and a maximum operating temperature of the gas turbine engine.

In certain exemplary embodiments, with differential thermal movement between the first component and the second component, the elliptical shaped opposing ends of the spoolie device contact interior surfaces of the sleeve portion in a bending deflection.

In certain exemplary embodiments the spoolie device bridges the first component and the second component in a radial direction to channel the flow of air from the first component to the second component.

In certain exemplary embodiments the sleeve portion comprises a first sleeve portion on an inner part of the first component and a second sleeve portion on an outer part of the second component.

In certain exemplary embodiments the first sleeve portion includes a first elliptical shaped interior surface and the second sleeve portion includes a second elliptical shaped interior surface.

In another exemplary embodiment of the present disclosure, a gas turbine engine having a fluid transfer connection is provided. The gas turbine engine includes a first component configured to channel a flow of air from a portion of the gas turbine engine; a second component configured to receive the flow of air from the first component, wherein the first component and the second component are movable relative to one another; and a sleeve portion disposed between the first component and the second component, the sleeve portion having elliptical shaped interior surfaces.

In certain exemplary embodiments the gas turbine engine includes a spoolie device disposed within the sleeve portion, wherein the spoolie device bridges the first component and the second component to channel the flow of air from the first component to the second component.

In certain exemplary embodiments the sleeve portion comprises a first sleeve portion on an inner part of the first component and a second sleeve portion on an outer part of the second component.

In certain exemplary embodiments the first sleeve portion includes a first elliptical shaped interior surface and the second sleeve portion includes a second elliptical shaped interior surface.

In certain exemplary embodiments the spoolie device forms a seal between the first component and the second component.

In certain exemplary embodiments the spoolie device forms the seal with relative positions between the first component and the second component changing.

In certain exemplary embodiments the spoolie device forms the seal between the first component and the second component both during an initial operating temperature of the gas turbine engine and a maximum operating temperature of the gas turbine engine.

In certain exemplary embodiments with differential thermal movement between the first component and the second component, the spoolie device contacts the elliptical shaped interior surfaces of the sleeve portion in a bending deflection.

In certain exemplary embodiments the spoolie device bridges the first component and the second component in a radial direction to channel the flow of air from the first component to the second component.

In an exemplary aspect of the present disclosure, a method is provided for channeling a flow of air between a first component and a second component of a gas turbine engine, wherein the first component and the second component are movable relative to one another. The method includes providing a fluid transfer connection comprising a sleeve portion disposed between the first component and the second component and a spoolie device disposed within the sleeve portion; channeling the flow of air from a portion of the gas turbine engine to the first component; channeling the flow of air from the first component to the second component with the spoolie device bridging the first component and the second component; forming a seal between the first component and the second component via the spoolie device with relative positions between the first component and the second component changing; and deflecting the spoolie relative to the sleeve portion in bending thereby reducing stresses and strains.

In certain exemplary aspects the spoolie device includes elliptical shaped opposing ends, and wherein, with differential thermal movement between the first component and the second component, the elliptical shaped opposing ends of the spoolie device contact interior surfaces of the sleeve portion in a bending deflection.

In certain exemplary aspects the sleeve portion includes elliptical shaped interior surfaces, and wherein, with differential thermal movement between the first component and the second component, the spoolie device contacts the elliptical shaped interior surfaces of the sleeve portion in a bending deflection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A fluid transfer connection of the present disclosure includes a sleeve portion disposed between a first component and a second component that are movable relative to one another and a spoolie device disposed within the sleeve portion. The spoolie device bridges the first component and the second component to channel a flow of air from the first component to the second component. In exemplary embodiments of the present disclosure, the sleeve portion includes elliptical shaped interior surfaces such that, with differential thermal movement between the first component and the second component, the spoolie device contacts the elliptical shaped interior surfaces of the sleeve portion in a bending deflection. In other exemplary embodiments of the present disclosure, the spoolie device includes elliptical shaped opposing ends such that, with differential thermal movement between the first component and the second component, the elliptical shaped opposing ends of the spoolie device contact interior surfaces of the sleeve portion in a bending deflection.

The unique geometries of the interior surfaces of the sleeve portion and/or the unique geometries of the ends of the spoolie device allow for greater mis-match in thermal growth between the spoolie device and interfacing components without resulting in a loose fit therebetween that is prone to wear. Advantageously, the sleeve portions and the spoolie device of the present disclosure reduce such wear by maintaining a tight fit between the spoolie device and the sleeve portion in a differential thermal growth environment with movement between the first component and the second component.

Unique features of the fluid transfer connection of the present disclosure include the interfacing interior surfaces of the sleeve portion. Furthermore, the spoolie device is sized to have an interference fit with the minor diameter of the interior surfaces of the sleeve portion and clearance at the major diameter. This allows the spoolie device to accommodate the interference with a bending deflection as opposed to hoop compression as is caused in conventional systems. The spoolie device and interfacing components operate at significantly different temperatures, and thus experience different amounts of thermal growth. The bending deflection due to the unique geometries of the interior surfaces of the sleeve portion and/or the unique geometries of the ends of the spoolie device provides more capability to accommodate these relative growths while maintaining a tight fit. Furthermore, the unique features of the fluid transfer connection of the present disclosure result in less of the total material of the spoolie device being yielded. This results in the "spring back" of the spoolie device being more effective after high temperature operating conditions to better maintain the interference fit with the sleeve portion. Conventional systems result in a hoop stress between the components that exceeds the yield strength of the tubes and that has a less effective "spring back".

Figure 1:
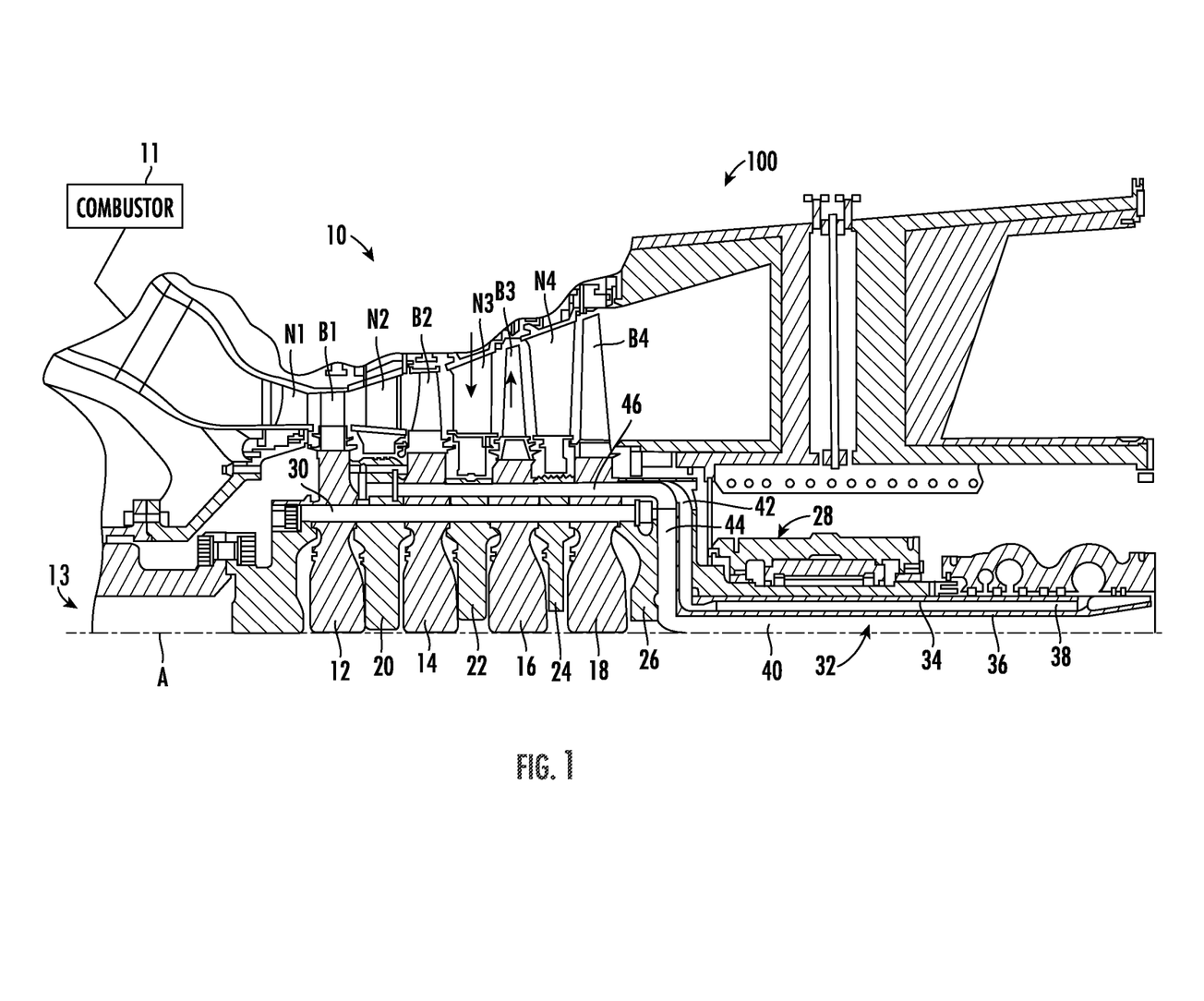
FIG. 1 is a cross-sectional view of a portion of an exemplary gas turbine engine in accordance with exemplary embodiments of the present disclosure.

Referring now to the drawings, FIG. 1 is a schematic cross-sectional view of a turbine section of a gas turbine engine in accordance with an exemplary embodiment of the present disclosure. Referring to FIG. 1, the turbine section 10 of a gas turbine 100 is partially illustrated. It should be appreciated that the gas turbine 100 of this disclosure may be utilized in a combined cycle system in which the exhaust gases exiting the gas turbine enter a heat recovery steam generator in which water is converted to steam in the manner of a boiler. Steam thus produced drives one or more steam turbines in which additional work is extracted to drive an additional load, such as a second generator, which, in turn, produces additional electric power.

The turbine section 10 of the gas turbine 100 is downstream of a turbine combustor 11 and includes a rotor, generally designated 13, with four successive stages comprising turbine wheels 12, 14, 16 and 18 mounted to and forming part of the rotor shaft assembly for rotation therewith. Each wheel carries a row of buckets B1, B2, B3 and B4, the blades of which project radially outwardly into the hot combustion gas path of the turbine. The buckets are arranged alternately between fixed nozzles N1, N2, N3 and N4. Alternately, between the turbine wheels from forward to aft are spacers 20, 22 and 24, each located radially inwardly of a respective nozzle. An aft disk 26 forms an integral part of the aft shaft 28 on the aft side of the last stage turbine wheel 18. It will be appreciated that the wheels and spacers are secured to one another by a plurality of circumferentially spaced axially extending bolts 30 (one shown), as in conventional gas turbine construction.

Referring still to FIG. 1, a bore tube assembly 32 forms part of the rotor 13 and rotates with the rotor about the rotor axis A. The bore tube assembly includes outer and inner tubes 34 and 36 defining annular steam cooling supply passage 38 and spent stream return passage 40. These passages communicate steam to and from the outer rim of the rotor through sets of radial conduits 42, 44 and axially extending conduits (one shown at 46) circumferentially spaced about the rotor rim for supplying cooling steam to the first and second stage buckets B1 and B2. Return or spent cooling steam flows through similar axially and radially extending conduits, respectively, for flow coaxially from the rotor bore via return passage 40.

Referring to FIG. 1, the nozzles N1, N2, N3 and N4 of the turbine section 10 provide components of the gas turbine engine 100 that move relative to one another and require channeling a flow of a fluid between the components.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, commercial engines, military engines, and/or land-based/industrial gas turbine engines. In other exemplary embodiments, a fluid transfer connection in accordance with the present disclosure may also be utilized between any two components that move relative to one another and for channeling a flow of a fluid between the components. For example, other applications may include purge air for a center frame, oil drain tubes, and other systems.

Figure 2:
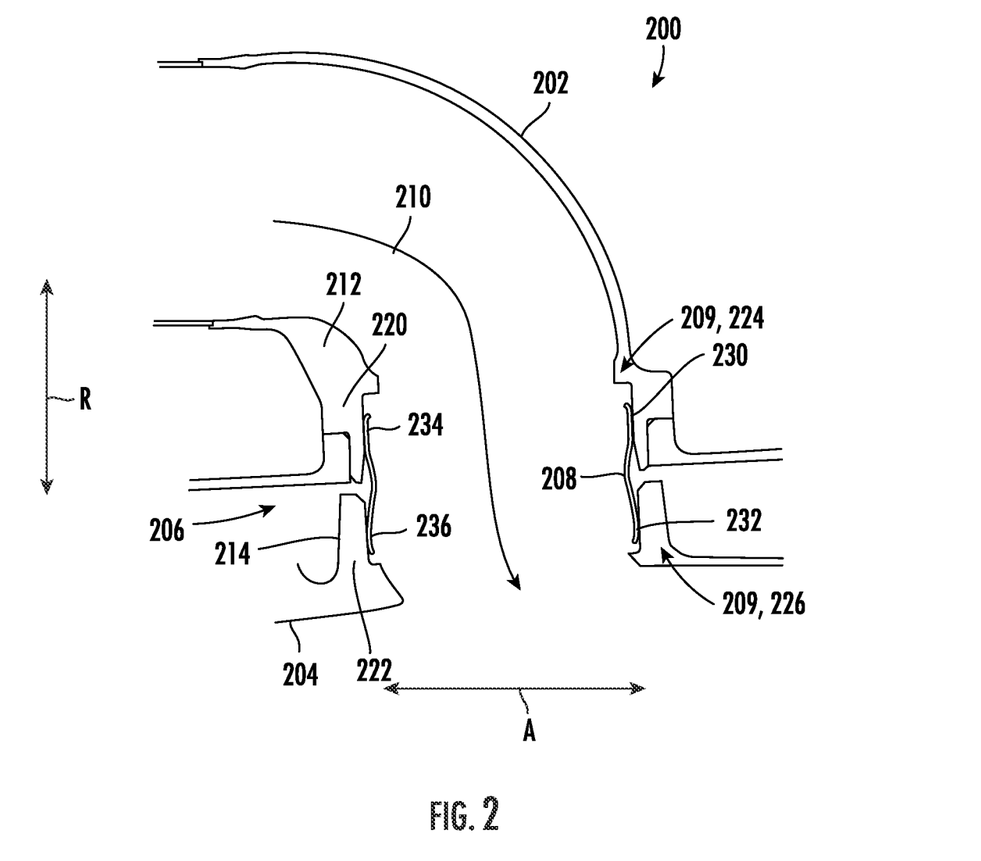
FIG. 2 is a cross-sectional view of a fluid transfer connection of a gas turbine engine in accordance with an exemplary embodiment of the present disclosure.
Figure 3:
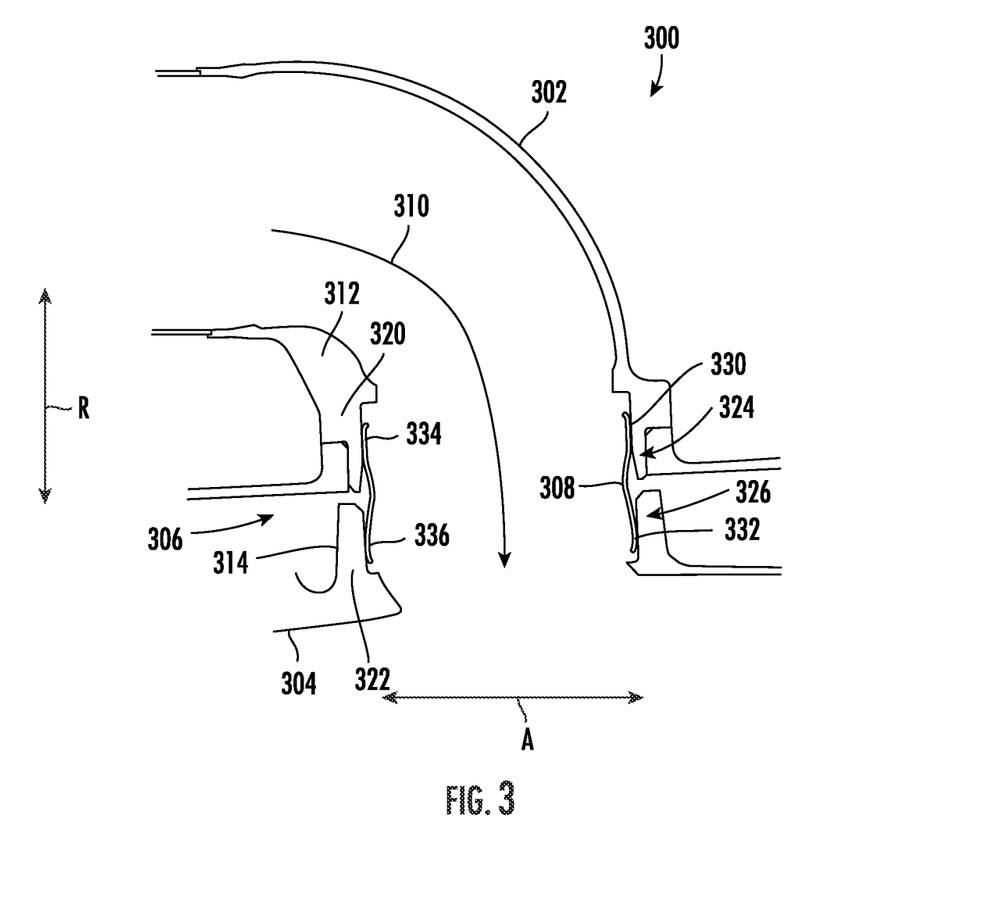
FIG. 3 is a cross-sectional view of a fluid transfer connection of a gas turbine engine in accordance with another exemplary embodiment of the present disclosure.

FIGS. 2-3 illustrate exemplary embodiments of the present disclosure. Referring to FIG. 2, in an exemplary embodiment of the present disclosure, a fluid transfer connection 200 of the present disclosure includes a first component 202, a second component 204, a sleeve portion 206, and a spoolie device 208. A fluid transfer connection 200 in accordance with an exemplary embodiment of the present disclosure may be incorporated into any fluid path of a gas turbine engine such as a turbine section 10 of the gas turbine engine 100 of FIG. 1. In an exemplary embodiment, the first and second components 202, 204 may form a portion of a turbine nozzle and a portion of a supporting casing.

Referring to FIG. 2, the first component 202 is configured to channel a flow of air 210 from a portion of the gas turbine engine 100 (FIG. 1). The second component 204 is configured to receive the flow of air 210 from the first component 202. In such a system, the first component 202 and the second component 204 are movable relative to one another. Importantly, the sleeve portion 206 and the spoolie device 208 of the present disclosure make a connection between the first and second components 202, 204 even while they move and their respective positions and alignments change.

Furthermore, differential thermal expansion and contraction between the first component 202 and the second component 204 must be accommodated for preventing unacceptably large thermal stresses during operation which would adversely affect the useful life of a component such as the nozzle. Accordingly, a spoolie device 208 of the present disclosure bridges the first component 202 and the second component 204 to channel the flow of air 210 from the first component 202 to the second component 204.

Referring to FIG. 2, the sleeve portion 206 is disposed between the first component 202 and the second component 204. Importantly, the sleeve portion 206 includes elliptical shaped interior surfaces 209. In an exemplary embodiment, the sleeve portion 206 includes a first sleeve portion 220 on an inner part 212 of the first component 202 and a second sleeve portion 222 on an outer part 214 of the second component 204. Furthermore, the first sleeve portion 220 includes a first elliptical shaped interior surface 224 and the second sleeve portion 222 includes a second elliptical shaped interior surface 226. It is contemplated that the interior surfaces of the sleeve portions may include other non-round shapes, for example, tri-lobe or other shapes.

Referring still to FIG. 2, the spoolie device 208 is disposed within the sleeve portion 206 and the spoolie device 208 bridges the first component 202 and the second component 204 to channel the flow of air 210 from the first component 202 to the second component 204. The spoolie device 208 forms a seal 230, 232 between the first component 202 and the second component 204. Furthermore, the spoolie device 208 forms the seal 230, 232 with relative positions between the first component 202 and the second component 204 changing. The spoolie device 208 forms the seal 230, 232 and aligns the first component 202 and the second component 204 both during an initial operating temperature of the gas turbine engine 100 and a maximum operating temperature of the gas turbine engine 100. In this manner, a spoolie device 208 of the present disclosure accommodates the differential thermal expansion and contraction between the first component 202 and the second component 204. Referring to FIG. 2, the spoolie device 208 bridges the first component 202 and the second component 204 in a radial direction R to channel the flow of air 210 from the first component 202 to the second component 204.

In an exemplary embodiment of the present disclosure, a first end 234 of the spoolie device 208 forms a first seal 230 with the first elliptical shaped interior surface 224 of the first sleeve portion 220 and a second end 236 of the spoolie device 208 forms a second seal 232 with the second elliptical shaped interior surface 226 of the second sleeve portion 222.

Importantly, by having the first sleeve portion 220 including a first elliptical shaped interior surface 224 and the second sleeve portion 222 including a second elliptical shaped interior surface 226, during differential thermal movement between the first component 202 and the second component 204, contact between the spoolie device 208 and the elliptical shaped interior surfaces 224, 226 of the sleeve portions 220, 222 result in a bending deflection therebetween. Importantly, exerting a bending deflection between the spoolie device 208 and the sleeve portion 206 in this manner results in a significant reduction in the stresses and strains exerted on the spoolie device 208. This eliminates failure of the spoolie device 208 at extreme operating temperatures of the gas turbine engine 100.

Conventional spoolie devices, with cylindrical interfacing surfaces, have a maximum analytically predicted value of 1287 pounds of contact force. The present disclosure spoolie device, with interfaces between and elliptical and spherical surfaces, have a maximum analytically predicted value of 775 pounds of contact force. The reduction in maximum force means that the permanent set distortion of the spoolie device of the present disclosure is less so that the minimum force increases from zero in conventional designs to 52 lbf in the improved spoolie device of the present disclosure. It is desired to maintain at least a small amount of interference force, because a loose part is subject to wear.

Referring to FIG. 2, the first end 234 of the spoolie device 208 may include a first elliptical shaped end. Furthermore, the second end 236 of the spoolie device 208 may include a second elliptical shaped end. In this manner, elliptical shaped opposing ends 234, 236 of the spoolie device 208 may respectively contact the elliptical shaped interior surfaces 224, 226 of the sleeve portions 220, 222.

Referring to FIG. 3, in another exemplary embodiment of the present disclosure, a fluid transfer connection 300 of the present disclosure includes a first component 302, a second component 304, a sleeve portion 306, and a spoolie device 308. A fluid transfer connection 300 in accordance with an exemplary embodiment of the present disclosure may be incorporated into any fluid path of a gas turbine engine such as a turbine section 10 of the gas turbine engine 100 of FIG. 1. In an exemplary embodiment, the first and second components 302, 304 may form a portion of a turbine nozzle and a portion of a supporting casing.

Referring to FIG. 3, the first component 302 is configured to channel a flow of air 310 from a portion of the gas turbine engine 100 (FIG. 1). The second component 304 is configured to receive the flow of air 310 from the first component 302. In such a system, the first component 302 and the second component 304 are movable relative to one another. Importantly, the sleeve portion 306 and the spoolie device 308 of the present disclosure make a connection between the first and second components 302, 304 even while they move and their respective positions and alignments change.

Furthermore, differential thermal expansion and contraction between the first component 302 and the second component 304 must be accommodated for preventing unacceptably large thermal stresses during operation which would adversely affect the useful life of a component such as the nozzle. Accordingly, a spoolie device 308 of the present disclosure bridges the first component 302 and the second component 304 to channel the flow of air 310 from the first component 302 to the second component 304.

Referring to FIG. 3, the sleeve portion 306 is disposed between the first component 302 and the second component 304. In an exemplary embodiment, the sleeve portion 306 includes a first sleeve portion 320 on an inner part 312 of the first component 302 and a second sleeve portion 322 on an outer part 314 of the second component 304.

Referring still to FIG. 3, the spoolie device 308 is disposed within the sleeve portion 306 and the spoolie device 308 bridges the first component 302 and the second component 304 to channel the flow of air 310 from the first component 302 to the second component 304. The spooler device 308 includes a first end 334 and an opposing second end 336. Importantly, the spoolie device 308 includes elliptical shaped opposing ends. For example, referring to FIG. 3, the first end 334 of the spoolie device 308 includes a first elliptical shaped end. Furthermore, the second end 336 of the spoolie device 308 includes a second elliptical shaped end. It is contemplated that the opposing ends of the spoolie device may include other non-round shapes, for example, tri-lobe or other shapes.

The elliptical shaped opposing ends 334, 336 of the spoolie device 308 form a seal 330, 332 between the first component 302 and the second component 304. Furthermore, the elliptical shaped opposing ends 334, 336 of the spoolie device 308 form the seal 330, 332 with relative positions between the first component 302 and the second component 304 changing. The elliptical shaped opposing ends 334, 336 of the spoolie device 308 form the seal 330, 332 and align the first component 302 and the second component 304 both during an initial operating temperature of the gas turbine engine 100 and a maximum operating temperature of the gas turbine engine 100. In this manner, a spoolie device 308 of the present disclosure accommodates the differential thermal expansion and contraction between the first component 302 and the second component 304. Referring to FIG. 3, the spoolie device 308 bridges the first component 302 and the second component 304 in a radial direction R to channel the flow of air 310 from the first component 302 to the second component 304.

In an exemplary embodiment of the present disclosure, the first end 334 of the spoolie device 308 forms a first seal 330 with the first sleeve portion 320 and the second end 336 of the spoolie device 308 forms a second seal 332 with the second sleeve portion 322.

Importantly, by having the spoolie device 308 including elliptical shaped opposing ends 334, 336, during differential thermal movement between the first component 302 and the second component 304, contact between the elliptical shaped opposing ends 334, 336 of the spoolie device 308 and respective sleeve portions 320, 322 result in a bending deflection therebetween. Importantly, exerting a bending deflection between the spoolie device 308 and the sleeve portion 306 in this manner results in a significant reduction in the stresses and strains exerted on the spoolie device 308. This eliminates failure of the spoolie device 308 at extreme operating temperatures of the gas turbine engine 100.

As described above, conventional spoolie devices, with cylindrical interfacing surfaces, have a maximum analytically predicted value of 1287 pounds of contact force. Referring to the exemplary embodiment of FIG. 3, the present disclosure spoolie device, with interfaces between and elliptical and spherical surfaces, have a maximum analytically predicted value of 775 pounds of contact force. The reduction in maximum force means that the permanent set distortion of the spoolie device of the present disclosure is less so that the minimum force increases from zero in conventional designs to 52 lbf in the improved spoolie device of the present disclosure. It is desired to maintain at least a small amount of interference force, because a loose part is subject to wear.

Referring to FIG. 3, in an exemplary embodiment, the sleeve portion 306 may include elliptical shaped interior surfaces. For example, in an exemplary embodiment, the first sleeve portion 320 may include a first elliptical shaped interior surface 324 and the second sleeve portion 322 may include a second elliptical shaped interior surface 326.

Figure 4:
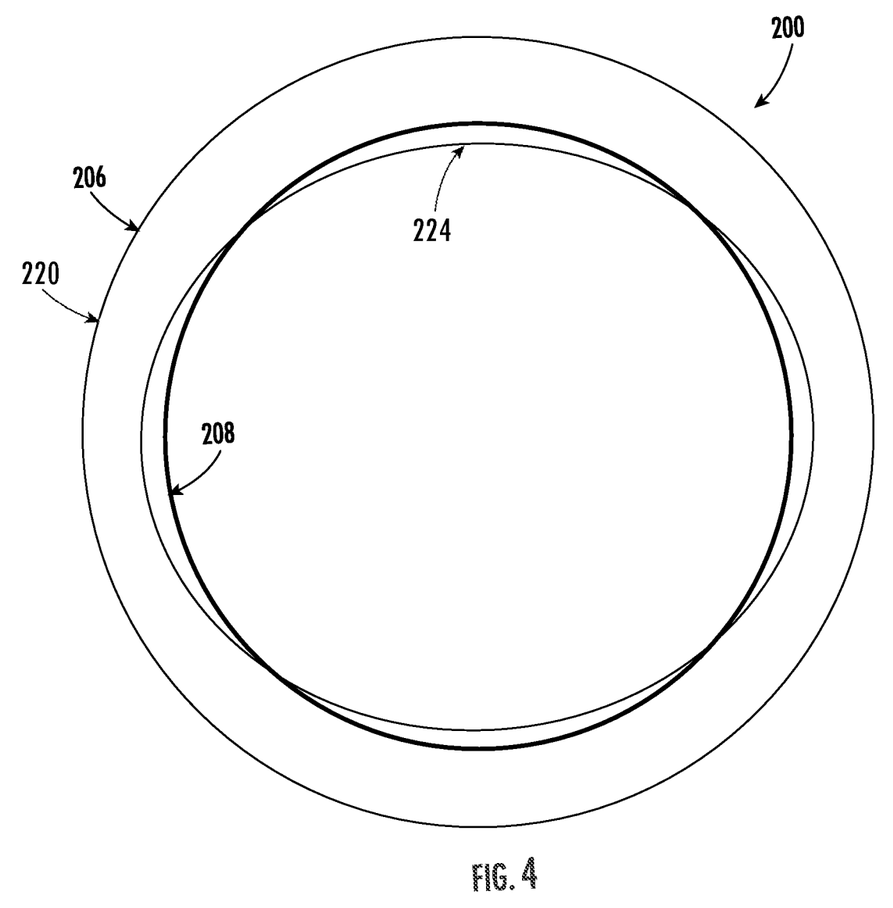
FIG. 4 is a cross-sectional view of a fluid transfer connection of a gas turbine engine illustrating the interference fit and bending compliance between components in accordance with an exemplary embodiment of the present disclosure.

As discussed above, conventional devices, with cylindrical interfacing surfaces, do not maintain contact all the way around and thus have an increase in leakage. Referring to FIG. 4, a fluid transfer connection 200 (FIG. 2) of the present disclosure having the first sleeve portion 220 including a first elliptical shaped interior surface 224 and the second sleeve portion 222 (FIG. 2) including a second elliptical shaped interior surface 226 (FIG. 2), provides a better interference fit all the way around and more bending compliance with respect to the sleeve portion 206 and the spoolie device 208.

Figure 5:
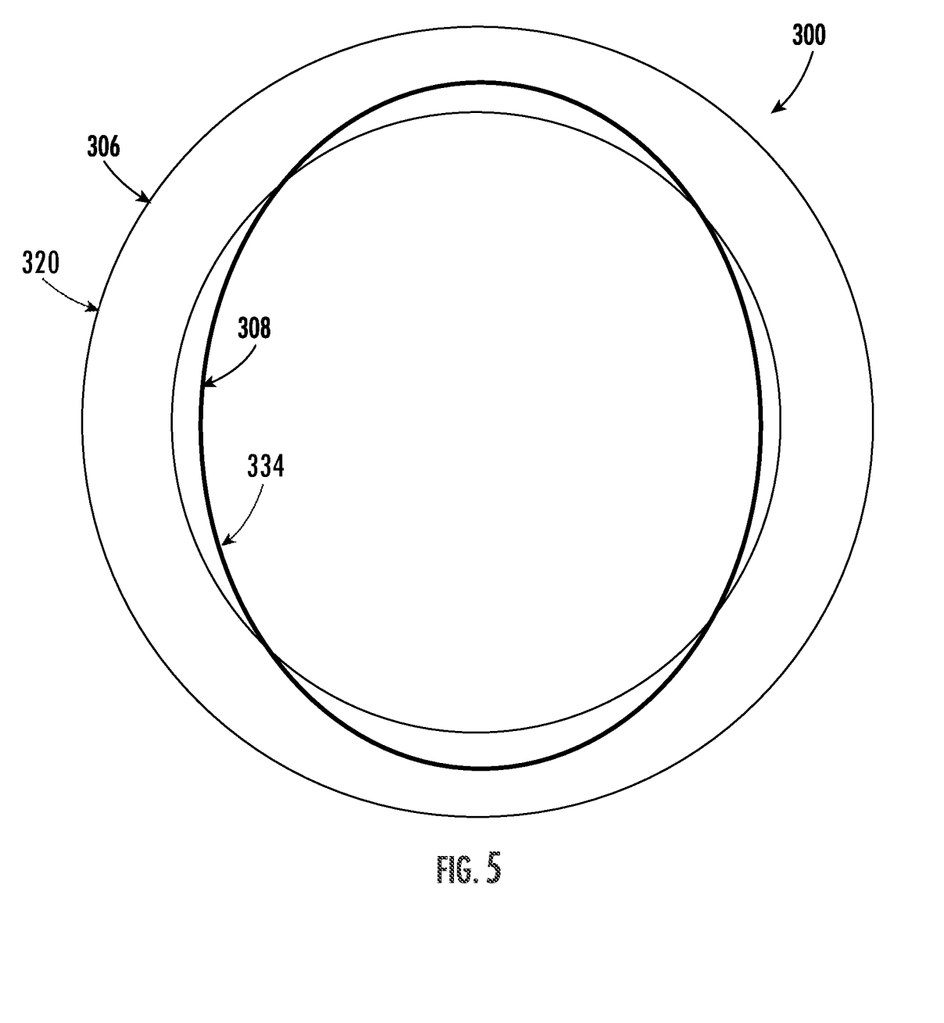
FIG. 5 is a cross-sectional view of a fluid transfer connection of a gas turbine engine illustrating the interference fit and bending compliance between components in accordance with another exemplary embodiment of the present disclosure.

Furthermore, referring to FIG. 5, a fluid transfer connection 300 of the present disclosure having the spoolie device 308 including elliptical shaped opposing ends (the first end 334 is shown in FIG. 5), provides a better interference fit all the way around and more bending compliance with respect to the sleeve portion 206 and the spoolie device 208.

In exemplary embodiments, a sleeve portion and/or a spoolie device of the present disclosure is formed using precision casting, advanced machining, or other traditional manufacturing machines or methods. In one exemplary embodiment, a spoolie device of the present disclosure may be machined from a metal bar stock. In other exemplary embodiments, a spoolie device of the present disclosure may be formed from tubing and/or formed from welded sheet metal.

In one exemplary embodiment, an outer sleeve portion may be machined on the spoolie interface surface for a smoother surface finish. In one exemplary embodiment, an inner sleeve portion may be formed using metal investment casting, machined on the spoolie interface surface for improved tolerances, and/or coated on the interface surface for wear resistance. In other exemplary embodiments, the sleeve portion may be machined from bar stock and/or formed from sheet metal welded or brazed into an assembly. Furthermore, coatings can be applied to any of the interfacing surfaces for wear resistance.

In other exemplary embodiments, a sleeve portion and/or a spoolie device of the present disclosure is formed using additive manufacturing machines or methods. As described in detail below, exemplary embodiments of the formation of a sleeve portion and/or a spoolie device involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming a sleeve portion and/or a spoolie device of the present disclosure using any suitable material. For example, the material may be metal or ceramic, or any other suitable material that may be in solid, liquid, powder, sheet material, wire, or any other suitable form that have sufficient temperature capabilities for the present disclosure. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single integral sleeve portion and/or spoolie device to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of a sleeve portion and/or a spoolie device of the present disclosure. Accordingly, a three-dimensional design model of the component may be defined prior to manufacturing. In this regard, a model or prototype of the component may be scanned to determine the three-dimensional information of the component. As another example, a model of a sleeve portion and/or a spoolie device of the present disclosure may be constructed using a suitable computer aided design (CAD) program to define the three-dimensional design model of the component.

The design model may include 3D numeric coordinates of the entire configuration of a sleeve portion and/or a spoolie device of the present disclosure including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, a sleeve portion and/or a spoolie device of the present disclosure described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of a sleeve portion and/or a spoolie device of the present disclosure may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of a sleeve portion and/or a spoolie device of the present disclosure is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

While the present disclosure is not limited to the use of additive manufacturing to form a sleeve portion and/or a spoolie device of the present disclosure generally, additive manufacturing does provide a variety of manufacturing advantages, including ease of manufacturing, reduced cost, greater accuracy, etc.

Also, the additive manufacturing methods described above enable much more complex and intricate shapes and contours of a sleeve portion and/or a spoolie device described herein to be formed with a very high level of precision. For example, such components may include thin additively manufactured layers, cross sectional features, and component contours. In addition, the additive manufacturing process enables the manufacture of a single integral sleeve portion and/or spoolie device having different materials such that different portions of the component may exhibit different performance characteristics. The successive, additive nature of the manufacturing process enables the construction of these novel features. As a result, a sleeve portion and/or a spoolie device of the present disclosure formed using the methods described herein may exhibit improved performance and reliability.

In an exemplary aspect of the present disclosure, a method is provided for channeling a flow of air between a first component and a second component of a gas turbine engine, wherein the first component and the second component are movable relative to one another. The method includes providing a fluid transfer connection comprising a sleeve portion disposed between the first component and the second component and a spoolie device disposed within the sleeve portion; channeling the flow of air from a portion of the gas turbine engine to the first component; channeling the flow of air from the first component to the second component with the spoolie device bridging the first component and the second component; forming a seal between the first component and the second component via the spoolie device with relative positions between the first component and the second component changing; and deflecting the spoolie relative to the sleeve portion in bending thereby reducing stresses and strains.

Further aspects of the invention are provided by the subject matter of the following clauses:

1. A gas turbine engine having a fluid transfer connection, comprising: a first component configured to channel a flow of air from a portion of the gas turbine engine; a second component configured to receive the flow of air from the first component, wherein the first component and the second component are movable relative to one another; a sleeve portion disposed between the first component and the second component; and a spoolie device disposed within the sleeve portion, the spoolie device having elliptical shaped opposing ends, wherein the spoolie device bridges the first component and the second component to channel the flow of air from the first component to the second component.

2. The gas turbine engine of any preceding clause, wherein the elliptical shaped opposing ends of the spoolie device form a seal between the first component and the second component.

3. The gas turbine engine of any preceding clause, wherein the elliptical shaped opposing ends of the spoolie device form the seal with relative positions between the first component and the second component changing.

4. The gas turbine engine of any preceding clause, wherein the elliptical shaped opposing ends of the spoolie device form the seal between the first component and the second component both during an initial operating temperature of the gas turbine engine and a maximum operating temperature of the gas turbine engine.

5. The gas turbine engine of any preceding clause, wherein, with differential thermal movement between the first component and the second component, the elliptical shaped opposing ends of the spoolie device contact interior surfaces of the sleeve portion in a bending deflection.

6. The gas turbine engine of any preceding clause, wherein the spoolie device bridges the first component and the second component in a radial direction to channel the flow of air from the first component to the second component.

7. The gas turbine engine of any preceding clause, wherein the sleeve portion comprises a first sleeve portion on an inner part of the first component and a second sleeve portion on an outer part of the second component.

8. The gas turbine engine of any preceding clause, wherein the first sleeve portion includes a first elliptical shaped interior surface and the second sleeve portion includes a second elliptical shaped interior surface.

9. A gas turbine engine having a fluid transfer connection, comprising: a first component configured to channel a flow of air from a portion of the gas turbine engine; a second component configured to receive the flow of air from the first component, wherein the first component and the second component are movable relative to one another; and a sleeve portion disposed between the first component and the second component, the sleeve portion having elliptical shaped interior surfaces.

10. The gas turbine engine of any preceding clause, further comprising a spoolie device disposed within the sleeve portion, wherein the spoolie device bridges the first component and the second component to channel the flow of air from the first component to the second component.

11. The gas turbine engine of any preceding clause, wherein the sleeve portion comprises a first sleeve portion on an inner part of the first component and a second sleeve portion on an outer part of the second component.

12. The gas turbine engine of any preceding clause, wherein the first sleeve portion includes a first elliptical shaped interior surface and the second sleeve portion includes a second elliptical shaped interior surface.

13. The gas turbine engine of any preceding clause, wherein the spoolie device forms a seal between the first component and the second component.

14. The gas turbine engine of any preceding clause, wherein the spoolie device forms the seal with relative positions between the first component and the second component changing.

15. The gas turbine engine of any preceding clause, wherein the spoolie device forms the seal between the first component and the second component both during an initial operating temperature of the gas turbine engine and a maximum operating temperature of the gas turbine engine.

16. The gas turbine engine of any preceding clause, wherein, with differential thermal movement between the first component and the second component, the spoolie device contacts the elliptical shaped interior surfaces of the sleeve portion in a bending deflection.

17. The gas turbine engine of any preceding clause, wherein the spoolie device bridges the first component and the second component in a radial direction to channel the flow of air from the first component to the second component.

18. A method of channeling a flow of air between a first component and a second component of a gas turbine engine, wherein the first component and the second component are movable relative to one another, the method comprising: providing a fluid transfer connection comprising a sleeve portion disposed between the first component and the second component and a spoolie device disposed within the sleeve portion; channeling the flow of air from a portion of the gas turbine engine to the first component; channeling the flow of air from the first component to the second component with the spoolie device bridging the first component and the second component; forming a seal between the first component and the second component via the spoolie device with relative positions between the first component and the second component changing; and deflecting the spoolie relative to the sleeve portion in bending thereby reducing stresses and strains.

19. The method of any preceding clause, wherein the spoolie device includes elliptical shaped opposing ends, and wherein, with differential thermal movement between the first component and the second component, the elliptical shaped opposing ends of the spoolie device contact interior surfaces of the sleeve portion in a bending deflection.

20. The method of any preceding clause, wherein the sleeve portion includes elliptical shaped interior surfaces, and wherein, with differential thermal movement between the first component and the second component, the spoolie device contacts the elliptical shaped interior surfaces of the sleeve portion in a bending deflection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine having a fluid transfer connection, comprising:
   a first component configured to channel a flow of air from a portion of the gas turbine engine;
   a second component configured to receive the flow of air from the first component, wherein the first component and the second component are movable relative to one another;
   a sleeve portion disposed between the first component and the second component, the sleeve portion having interior surfaces; and
   a spoolie device disposed within the sleeve portion, the spoolie device having elliptical shaped opposing ends including a major diameter and a minor diameter, wherein the spoolie device bridges the first component and the second component to channel the flow of air from the first component to the second component, and the elliptical shaped opposing ends of the spoolie device form an interference fit with the interior surfaces of the sleeve portion such that the major diameter of the spoolie device and the minor diameter of the spoolie device contact the interior surfaces of the sleeve portion in a bending deflection at the elliptical shaped opposing ends.

2. The gas turbine engine of claim 1, wherein the elliptical shaped opposing ends of the spoolie device form a seal between the first component and the second component.

3. The gas turbine engine of claim 2, wherein the elliptical shaped opposing ends of the spoolie device form the seal between the first component and the second component both during an initial operating temperature of the gas turbine engine and a maximum operating temperature of the gas turbine engine.

4. The gas turbine engine of claim 1, wherein, with differential thermal movement between the first component and the second component, the elliptical shaped opposing ends of the spoolie device contact the interior surfaces of the sleeve portion in the bending deflection.

5. The gas turbine engine of claim 1, wherein the spoolie device bridges the first component and the second component in a radial direction to channel the flow of air from the first component to the second component.

6. The gas turbine engine of claim 1, wherein the sleeve portion comprises a first sleeve portion on an inner part of the first component and a second sleeve portion on an outer part of the second component.

7. The gas turbine engine of claim 6, wherein the first sleeve portion includes a first elliptical shaped interior surface of the interior surfaces and the second sleeve portion includes a second elliptical shaped interior surface of the interior surfaces.

8. The gas turbine engine of claim 1, wherein the interior surfaces of the sleeve portion are spherical.

9. A gas turbine engine having a fluid transfer connection, comprising:
   a first component configured to channel a flow of air from a portion of the gas turbine engine;
   a second component configured to receive the flow of air from the first component, wherein the first component and the second component are movable relative to one another;
   a sleeve portion disposed between the first component and the second component, the sleeve portion having elliptical shaped interior surfaces that include a major diameter and a minor diameter; and a spoolie device disposed within the sleeve portion, wherein the spoolie device bridges the first component and the second component to channel the flow of air from the first component to the second component, and the spoolie device forms an interference fit with the elliptical shaped interior surfaces of the sleeve portion such that the spoolie device contacts the elliptical shaped interior surfaces of the sleeve portion at the minor diameter of the sleeve portion and at the major diameter of the sleeve portion in a bending deflection at the elliptical shaped interior surfaces.

10. The gas turbine engine of claim 9, wherein the sleeve portion comprises a first sleeve portion on an inner part of the first component and a second sleeve portion on an outer part of the second component.

11. The gas turbine engine of claim 10, wherein the first sleeve portion includes a first elliptical shaped interior surface and the second sleeve portion includes a second elliptical shaped interior surface.

12. The gas turbine engine of claim 11, wherein the spoolie device forms a seal between the first component and the second component.

13. The gas turbine engine of claim 12, wherein the spoolie device forms the seal between the first component and the second component both during an initial operating temperature of the gas turbine engine and a maximum operating temperature of the gas turbine engine.

14. The gas turbine engine of claim 9, wherein, with differential thermal movement between the first component and the second component, the spoolie device contacts the elliptical shaped interior surfaces of the sleeve portion in the bending deflection.

15. The gas turbine engine of claim 14, wherein the spoolie device bridges the first component and the second component in a radial direction to channel the flow of air from the first component to the second component.

16. The gas turbine engine of claim 9, wherein the spoolie device includes a first end and a second end, and the first end and the second end are spherical.

17. A method of channeling a flow of air between a first component and a second component of a gas turbine engine, wherein the first component and the second component are movable relative to one another, the method comprising:
   providing a fluid transfer connection comprising a sleeve portion disposed between the first component and the second component, the sleeve portion including interior surfaces;
   providing a spoolie device disposed within the sleeve portion, the spoolie device forming an interference fit with the interior surfaces such that the spoolie device contacts the interior surfaces of the sleeve portion at a first diameter and at a second diameter in a bending deflection at the first diameter and at the second diameter;
   channeling the flow of air from a portion of the gas turbine engine to the first component;
   channeling the flow of air from the first component to the second component with the spoolie device bridging the first component and the second component;
   forming a seal between the first component and the second component via the spoolie device with relative positions between the first component and the second component changing; and
   deflecting the spoolie device relative to the sleeve portion in the bending deflection.

18. The method of claim 17, wherein the spoolie device includes elliptical shaped opposing ends, and wherein, with differential thermal movement between the first component and the second component, the elliptical shaped opposing ends of the spoolie device contact the interior surfaces of the sleeve portion in the bending deflection.

19. The method of claim 17, wherein the interior surfaces of the sleeve portion includes elliptical shaped interior surfaces, and wherein, with differential thermal movement between the first component and the second component, the spoolie device contacts the elliptical shaped interior surfaces of the sleeve portion in the bending deflection.

20. The method of claim 17, further comprising forming the seal between the first component and the second component both during an initial operating temperature of the gas turbine engine and a maximum operating temperature of the gas turbine engine.

\* \* \* \* \*